N. W. STORER.
CONTROL SYSTEM.
APPLICATION FILED OCT. 27, 1915.

1,291,233.                              Patented Jan. 14, 1919.

WITNESSES:
P. J. Fitzgerald
W. B. Wells

INVENTOR
Norman W. Storer.
BY
Wesley G. Carr
ATTORNEY

UNITED STATES PATENT OFFICE.

NORMAN W. STORER, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,291,233.        Specification of Letters Patent.        Patented Jan. 14, 1919.

Application filed October 27, 1915. Serial No. 58,134.

*To all whom it may concern:*

Be it known that I, NORMAN W. STORER, a citizen of the United States, and a resident of Pittsburgh, in the county of Allegheny and State of Pennsylvania, have invented a new and useful Improvement in Control Systems, of which the following is a specification.

My invention relates to control systems for electric vehicles and particularly to vehicles having the driving motors supplied with energy by storage batteries.

One object of my invention is to provide a system of control for an electric vehicle of the above indicated class which will make a high rate of speed on various grades and which will accelerate rapidly in a steady progression.

Another object of my invention is to provide a system of control for a vehicle of the class above indicated which will regenerate energy to recharge the storage battery when running down grades of various degrees, and, in decelerating, will regenerate energy for recharging the battery and for dynamic braking.

More specifically, my invention embodies a control system of the above indicated class having a series motor provided with separate means for exciting the field-magnet windings in certain control positions, to maintain a steady running speed and to permit regeneration on deceleration and in running down grade without reversing the armature and field-winding terminals relative to one another. The storage battery is divided into units, so that the field-magnet windings may be separately excited, at certain controller positions, by a small portion of the battery and, at other controller positions for higher speed, this small portion may be used in series with the remainder of the battery, thus obtaining the advantages of a series motor combined with those of a shunt-wound motor.

Figure 1:
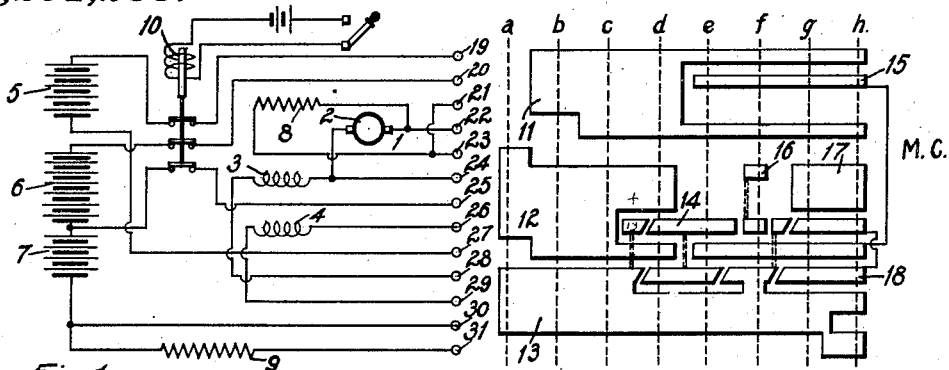

My invention is illustrated in the accompanying drawings in which Figure 1 is a diagrammatic view of a controller and the circuit connections of a control system embodying my invention, and Figs. 2 to 9, inclusive, are simplified diagrammatic views of the circuit connections for the motors that are established in different positions of the controller.

Referring to the drawings, a series motor 1, embodying an armature 2 and field magnet windings 3 and 4, is connected by a controller MC to storage batteries 5, 6 and 7 and to resistors 8 and 9. A switch 10 is shown for breaking the circuits of the batteries 5, 6 and 7, when coasting without regeneration is desired.

The controller MC embodies conducting segments 11, 12, 13, 14, 15, 16, 17 and 18 which coöperatively engage a plurality of stationary contact terminals 19, 20, 21, 22, 23, 24, 25, 26, 27, 28, 29, 30 and 31 upon the position-indicating lines *a*, *b*, *c*, *d*, *e*, *f*, *g* and *h*.

Figure 2:
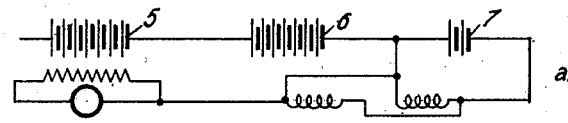

The position *a* is used only for dynamic braking below the regenerative speed required for recharging the batteries and will be described later. The other positions of the controller are employed in accelerating the motor to full speed. In position *a* of the controller MC, connection is made between contact terminals 23, 24, 25 and 26 and controller segment 12, and between contact terminals 28, 29 and 30 and controller segment 13. Thus, a circuit is established from one terminal of the battery 7 including switch 10, contact terminal 25, controller segment 12, where the circuit divides, one branch including contact terminal 24, field magnet winding 3, contact terminal 28, segment 13, and contact terminals 30 to the other battery terminal, and the other branch embodying contact terminal 26, field-magnet winding 4, contact terminal 29, controller segment 13 and the contact terminal 30 to the other battery terminal. Thus, the field magnet windings 3 and 4 are connected in series-parallel-circuit relation with the battery 7, and the resistor 8 is connected to the terminals of the armature 2. Circuit connections for this controller position are shown in Fig. 2.

Figure 3:
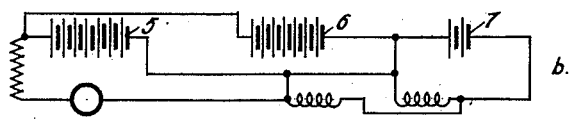

In moving from position *a* to position *b* of the controller, the connection is broken between contact terminal 23 and the segment 12, and connection is made between contact terminals 19, 20 and 21 and the segment 11, and between contact terminal 27 and segment 12. The series-parallel-circuit relation of the field-magnet windings 3 and 4 with the battery 7 is maintained, the shunt circuit including the resistor 8 is broken, and a circuit is established placing the batteries 5 and 6 in series-parallel-circuit relation with the armature 2 and the resistor 8. This latter circuit is traced from the armature 2 through the resistor 8, contact terminal 21 and controller segment 11 where the circuit divides, one branch including contact terminal 19, switch 10, battery 5, contact terminal 27, controller segment 12 and the contact terminal 24 to the armature 2, and the second branch including contact terminal 20, switch 10, battery 6, switch 10, contact terminal 25, controller segment 12 and the contact terminal 24 to the armature 2. The connections for this controller position are shown in Fig. 3.

Figure 4:
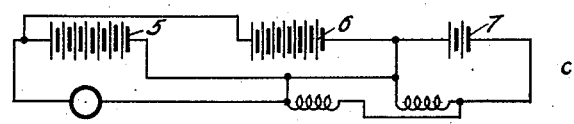

When the controller is moved to position $c$, the contact terminal 22 engages the controller segment 11. Thus, the resistor 8 is excluded from the armature circuit, and the speed of the motor is increased. The circuit connections of this controller position are shown in Fig. 4.

Figure 5:
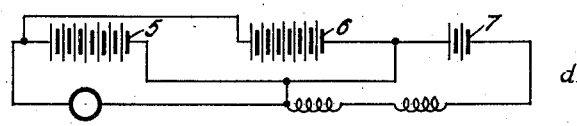

In moving from position $c$ to position $d$ of the controller, the engagement between contact terminal 26 and segment 12 and that between contact terminal 28 and controller segment 13 are broken and the contact terminals 26 and 28 engage the controller segment 14. By this change of connections, field-magnet windings 3 and 4 are placed in series with the battery 7, as shown in Fig. 5 of the drawings.

Between positions $c$ and $d$ of the controller, in changing the field-magnet windings from series-parallel circuit to series relation with the battery 7, a transition step is established, during which, a temporary shunt circuit is connected around the field-magnet winding 4. This is accomplished by the contact terminal 26 breaking contact with controller segment 12 and engaging controller segment 13 before engaging the controller segment 14.

Figure 6:
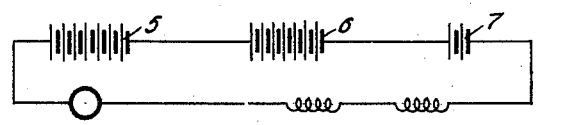

In moving to position $e$, the controller breaks the connection between the contact terminals 20 and 21 and segment 11 and between the contact terminals 24, 25 and 27 and segment 12 and makes connection between the contact terminals 20 and 27 and the controller segment 15. Thus, a circuit is established from one terminal of the battery 5 through switch 10, contact terminal 19, controller segment 11, contact terminal 22, armature 2, field-magnet winding 3, contact terminal 28, controller segment 14, contact terminal 26, field-magnet winding 4, contact terminal 29, controller segment 13, contact terminal 30, batteries 7 and 6, switch 10, contact terminal 20, controller segment 15 and contact terminal 27 to the battery 5. Thus, batteries 5, 6 and 7, armature 2 and field-magnet windings 3 and 4 are placed in series-circuit relation with each other, as shown in Fig. 6.

Figure 7:
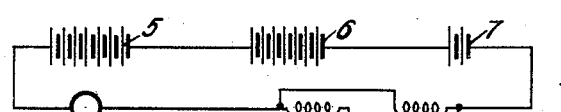

In moving to position $f$, the controller breaks the connection between segment 14 and contact terminals 26 and 28 and makes connection between controller segment 16 and contact terminals 24 and 26 and between contact terminal 28 and segment 13. Thus, the field-magnet windings 3 and 4 are connected in series-parallel-circuit relation with the armature 2 and the batteries 5, 6 and 7. The circuit connections are shown in Fig. 7.

Figure 8:
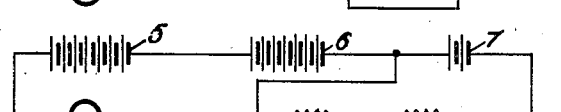

If the controller is moved to position $g$, the connection is broken between the contact terminal 28 and segment 13, and between contact terminals 24 and 26 and the controller segment 16, while contact terminals 24 and 25 engage controller segment 17, and contact terminals 26 and 28 engage controller segment 18. Thus, the armature 2 is placed in series with batteries 5 and 6, and the battery 7 is placed in series with the field-magnet windings 3 and 4, as shown in Fig. 8.

Between positions $f$ and $g$ of the controller is a transition step, during which the contact terminal 26 engages controller segment 13 after breaking contact with controller segment 16 and before engaging controller segment 18. The field-magnet winding 4 is thus placed in a shunt circuit, as in the transition step between position $c$ and $d$ of the controller.

Figure 9:
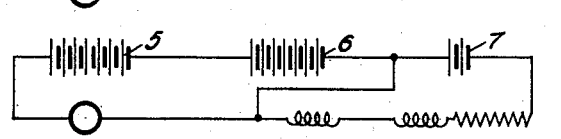

In moving from position $g$ to position $h$ of the controller, engagement is broken between contact terminal 30 and controller segment 13 and engagement is made between contact terminal 31 and controller segment 13. Thus, field-magnet windings 3 and 4 are connected in series with resistor 9 and battery 7, as shown in Fig. 9.

In positions $g$, $d$, $c$, $b$ and $a$ of the controller, the field-magnet windings 3 and 4 are separately excited by battery 7, and, because of this separate excitation, it is possible to regenerate for braking or for recharging the battery on running down grade or when decelerating. Moreover, no reversing switch is required to reverse the direction of the currents flowing through the armature and field-magnet windings relative to each other. In returning the controller to zero position, it is only necessary to stop at one of the above steps, according to the speed of the vehicle or the grade. Position $g$ is used to regenerate when running at a speed from twenty to twenty-five miles per hour and on grades not exceeding five percent., position $d$ being used on medium grades, position $c$ on medium heavy grades and position $b$ on heavy grades. Position $a$ is adapted for dynamic braking only.

If it is desired to throw off the controller without dynamic braking or regenerating for battery charging and to coast, the switch 10 must be operated to disconnect the batteries 5, 6 and 7 from the motor circuit. This switch 10 may be operated by a hand switch or by a slip-segment controller, as disclosed in my application, Serial No. 774,394, filed June 18, 1913.

Various modifications in the circuit connections and arrangement of the controller positions may be effected within the spirit and scope of my invention, and I desire, therefore, that only such limitations shall be imposed as are indicated in the appended claims.

I claim as my invention:

1. In a control system, the combination with an electric motor having an armature and a plurality of field windings, and a storage battery divided into sections for operating the motor, of means for energizing the armature and the field windings by all of said battery sections during acceleration of the motor and for separately exciting the armature and the field windings while varying the circuit relations of the field windings to recharge the battery upon deceleration of the motor without reversing the connections of the armature and field windings relative to each other.

2. In a control system, the combination with an electric motor having armature and field windings, and two batteries, of means for separately exciting the field and the armature windings by said batteries to regenerate energy under predetermined conditions and for exciting the field and armature windings by means of said batteries connected in series-circuit relation to each other to accelerate the motors.

3. In a control system, the combination with a series motor having armature and field windings, and a battery divided into sections, of means for separately exciting the armature and field windings by different sections of said battery, and for exciting the armature and field windings by all sections of the battery connected in series relation in order to obtain a steady progression in speed in accelerating and a recharging of the battery in decelerating.

4. In a control system, the combination with an electric motor having an armature and two field windings, and a storage battery divided into three sections, of means for connecting two sections of said battery in series-circuit or series-parallel-circuit relation to said armature, for connecting the field windings in series-circuit or series-parallel-circuit relation to the third section of said battery, and for connecting the armature and field windings in series with the three battery sections.

5. In a control system for an electric vehicle, the combination with an electric motor having an armature and field windings, and a battery divided into sections, of means for connecting the armature winding in circuit with a portion and all of said battery during acceleration, and means for connecting the field windings in various circuit relations and for separately exciting them by a portion of said battery in order to recharge the remaining portion of the battery when running down grade or decelerating without reversing the connections of the field winding relative to the armature winding.

6. In a control system, the combination with an electric motor having armature and field windings, a plurality of storage batteries, and a controller, of means for accelerating the motor from the storage batteries when the controller is moved in one direction and for regenerating energy for braking and for recharging the battery during the return of the controller to zero position, and means for returning the controller to zero position without regeneration.

7. In a control system, the combination with a motor having an armature and two field windings and three batteries, of switches and circuit connections for connecting said field windings in parallel-circuit relation to one battery and the two remaining batteries in parallel-circuit relation to said armature or connecting the two field windings in series-circuit relation to one battery and the remaining batteries in parallel-circuit relation with the armature, to obtain progressive steps in speed during acceleration and recharging of the battery during deceleration.

8. In a control system for an electric vehicle, the combination with a motor having an armature and two field windings, and three batteries, of means for connecting two of said batteries in series with the armature and said two field windings in series with the third battery, for connecting said two batteries in series-parallel-circuit relation with the armature and said two field windings in series with the third battery and for connecting said two batteries in parallel-circuit relation with the armature and the two field windings in parallel-circuit relation with the third battery, whereby the batteries may be recharged while running down grades.

9. In a control system for an electric vehicle, the combination with a driving motor having an armature and two field windings, a plurality of batteries and a resistor, of means for connecting the two batteries in series-circuit or series-parallel-circuit relation with the armature and said two field windings in series-circuit or series-parallel-circuit relation with the third battery for recharging the batteries in running down grade, and for excluding the armature from the battery circuits and to connect the resistor in series with the armature and the two field windings in parallel-circuit relation with one battery for dynamic braking.

10. The method of controlling a motor having two field windings which consists in connecting the two field windings in parallel-circuit relation to one battery and two batteries in parallel-circuit relation to the armature; connecting the two field windings in series-circuit relation with one battery and the two batteries in parallel-circuit relation to the armature; connecting three batteries, the armature and the two field windings in series-circuit relation to each other; connecting the two field windings in series-parallel-circuit relation with the armature and the three battery sections; and in connecting the two field windings in series with one battery and the two batteries in series with the armature.

11. The method of controlling a motor having two field windings and of regenerating storage batteries while running down grades or decelerating which consists; in connecting two batteries in series-circuit relation with the armature and the two field windings in series-circuit relation with one battery; connecting two batteries in parallel-circuit relation with the armature and the two field windings in series with one battery; and connecting two batteries in parallel-circuit relation with the armature and the two field windings in parallel-circuit relation with one battery.

12. The method of control for the driving motor having two field windings which consists, during acceleration, in connecting the two field windings in parallel-circuit relation to one battery and two batteries in parallel-circuit relation with the armature; connecting the two field windings in series-circuit relation with one battery and two batteries in series-parallel-circuit relation to the armature; connecting three batteries; the armature and the two field windings in series-circuit relation to each other; connecting two field windings in series-parallel-circuit relation with the armature and the three battery sections; and connecting the two field windings in series with one battery and the remaining two batteries in series with the armature; and, during deceleration or in running down grades, in connecting two batteries in series-circuit relation with the armature of the motor and the two field windings in series-circuit relation with one battery; connecting two batteries in parallel-circuit relation with the armature and the two field windings in series with one battery; and connecting the two batteries in parallel-circuit relation with the armature and the two field windings in parallel-circuit relation with one battery.

13. In a control system, the combination with an electric motor having armature and field windings, of a storage battery divided into sections, means for energizing the field windings in various circuit relations with a portion and all of said battery sections during acceleration, and means for separately exciting said field windings in order to regenerate energy when the motor is being decelerated.

In testimony whereof, I have hereunto subscribed my name this 22nd day of Oct., 1915.

NORMAN W. STORER.